(12) United States Patent
Horng et al.

(10) Patent No.: US 6,608,412 B2
(45) Date of Patent: Aug. 19, 2003

(54) ELECTRIC POWER CONNECTION STRUCTURE OF A DIRECT CURRENT MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/022,346

(22) Filed: Dec. 20, 2001

(65) Prior Publication Data
US 2003/0117029 A1 Jun. 26, 2003

(51) Int. Cl.[7] .................................................. H02K 5/00
(52) U.S. Cl. ............................................ 310/71; 310/89
(58) Field of Search ....................... 310/89, 71, DIG. 6, 310/67 R

(56) References Cited

U.S. PATENT DOCUMENTS

| | | | | |
|---|---|---|---|---|
| 4,398,135 A | * | 8/1983 | Busch et al. ................. | 318/443 |
| 4,727,274 A | * | 2/1988 | Adam et al. ................. | 310/239 |
| 4,853,568 A | * | 8/1989 | Fujiwara ..................... | 310/68 C |
| 5,334,897 A | * | 8/1994 | Ineson et al. ................ | 310/89 |
| 5,945,766 A | * | 8/1999 | Kim et al. ................... | 310/268 |
| 6,268,669 B1 | * | 7/2001 | Wakao et al. ............... | 310/67 R |

* cited by examiner

Primary Examiner—Dang Le
(74) Attorney, Agent, or Firm—Bacon & Thomas, PLLC

(57) ABSTRACT

An electric power connection structure of a direct current motor is provided. The outer wall of the motor housing is provided with a power plate which is provided with connection terminals and connection circuits. The connection circuit has a first end formed with a connection terminal that may be connected to an electric power for driving the motor to rotate, and a second end electrically connected to an drive circuit that may control the motor to start and rotate.

7 Claims, 5 Drawing Sheets

ELECTRIC POWER CONNECTION STRUCTURE OF A DIRECT CURRENT MOTOR

BACKGROUND OF THE INVENTION

1. Field of the Invention

The present invention relates to an electric power connection structure of a direct current motor, and more particularly to an electric power connection structure of a direct current motor, wherein the connection circuit of the electric power may be positioned conveniently, and cannot be torn out.

2. Description of the Related Art

A first conventional heatsink fan 90 having a direct current motor in accordance with the prior art shown in FIG. 6 comprises a power cord 92 which is connected to a stator coil 91, reeved through a frame 93 of a housing and a baffle 94, and is then drawn out. Thus, the frame 93 and the baffle 94 may absorb the external pulling force to the power cord 92 outside of the frame 93, thereby preventing the power cord 92 from being pulled to detach from the stator coil 91.

A second conventional heatsink fan 80 in accordance with the prior art shown in FIGS. 7 and 8 comprises a power cord 82 which is connected to a stator coil 81, is pressed by a press rod 84 of a cover plate 83, is reeved through the wall 85 of a housing, and is then drawn out. Thus, the press rod 84 and the wall 85 of the housing may absorb the external pulling force to the power cord 82 outside of the housing of the heatsink fan 80, thereby preventing the power cord 82 from being pulled to detach from the stator coil 81.

In the above-mentioned conventional heatsink fan which uses a direct current motor, the connection design of the power cord mainly uses tiny cords that are protruded outward from the frame to connect the electric power. Thus, the frame 93 and the baffle 94 or the press rod 84 and the wall 85 of the housing may absorb the external pulling force on the power cord, thereby preventing the power cord from being pulled to detach from the stator coil. However, the conventional heatsink fan using a direct current motor has to prevent the power cord from being pulled to detach from the stator coil, so that the fabrication of the conventional heatsink fan is inconvenient. In addition, the electric cords are protruded outward from the frame to connect the electric power, thereby decreasing the aesthetic quality of the conventional heatsink fan.

SUMMARY OF THE INVENTION

The primary objective of the present invention is to provide an electric power connection structure of a direct current motor, wherein the electric power connection structure may be processed and manufactured conveniently, and the connection circuit of the electric power may be positioned conveniently, and cannot be torn out.

In accordance with the present invention, there is provided an electric power connection structure of a direct current motor, wherein the outer wall of the motor housing is provided with a power plate which is provided with connection terminals and connection circuits. The connection circuit has a first end formed with a connection terminal that may be connected to an electric power for driving the motor to rotate, and a second end electrically connected to an drive circuit that may control the motor to start and rotate.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
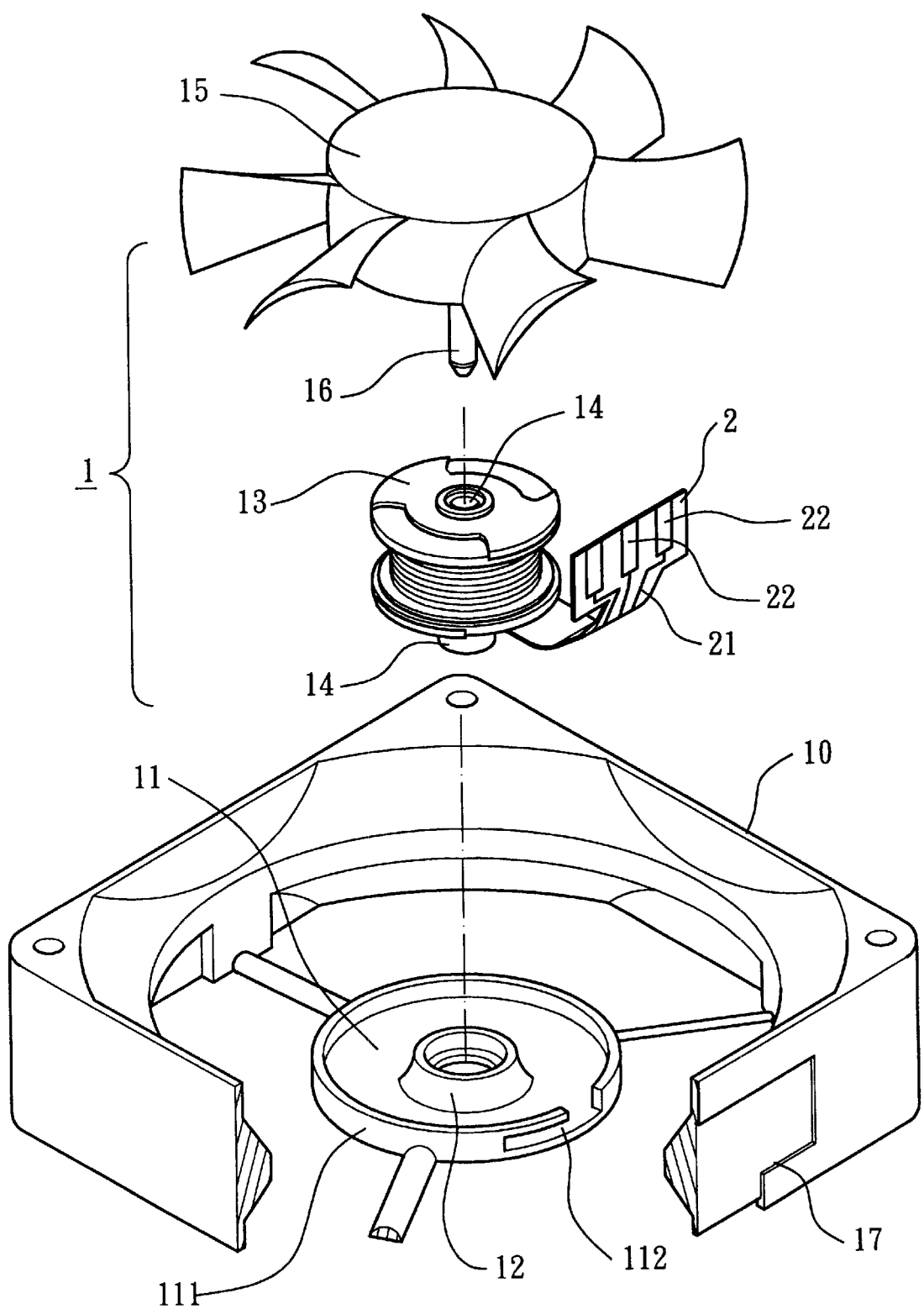
FIG. 1 is an exploded perspective view in accordance with a first embodiment of the present invention.

Referring to the drawings and initially to FIG. 1, a direct current motor 1 in accordance with a first embodiment of the present invention comprises a housing 10 having a bottom board 11 provided with a shaft seat 12 combined with a shaft tube 14 of a stator 13. A rotor 15 has a rotation shaft 16 rotatably mounted in the shaft tube 14. The housing 10 has an outer wall provided with a power plate 2. The power plate 2 includes connection circuits 21. The connection circuits 21 each has a first end formed with a connection terminal 22 that may be connected to the electric power source, and a second end electrically connected to a circuit board 131 (see FIG. 3) that has a drive circuit. In the preferred embodiment, the power plate 2 and the circuit board 131 of the present invention may be formed by the same film printed circuit. In addition, the outer wall of the housing 10 may be provided with an insertion groove 17 so that the power plate 2 may be inserted into and positioned in the insertion C-groove 17. If necessary, the bottom board 11 of the housing 10 has an annular wall 111 which is provided with a cutout 112 for passage of the connection circuit 21.

Figure 2:
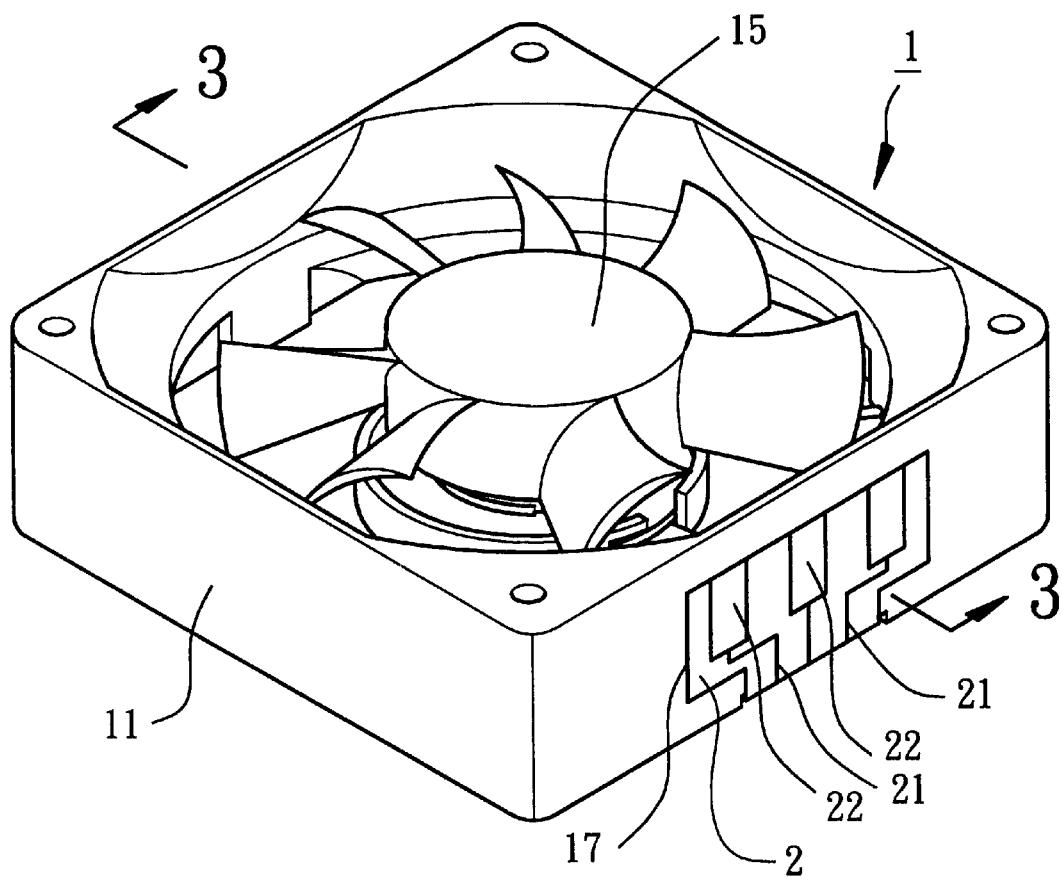
FIG. 2 is a perspective assembly view in accordance with the first embodiment of the present invention.
Figure 3:
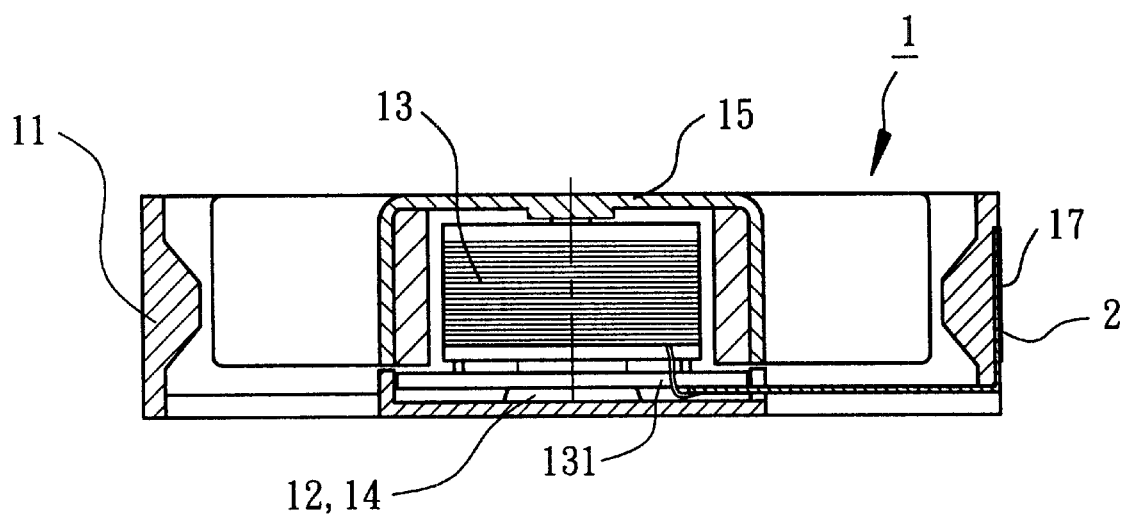
FIG. 3 is a cross-sectional view taken along line 3—3 as shown in FIG. 2.

Referring to FIGS. 2 and 3, the direct current motor 1 in accordance with the first embodiment of the present invention is assembled. The circuit board 131 of the motor 1 is connected with the connection circuit 21 of the power plate 2 which is passed through the cutout 112 of the bottom board 11 of the housing 10. The power plate 2 may be inserted into and positioned in the insertion groove 17 of the housing 10. The connection terminal 22 of the power plate 2 may be connected to the electric power. Thus, the circuit board 131 having a drive circuit may be electrically connected to the connection circuit 21 of the power plate 2, and power plate 2 may be inserted into and positioned in the insertion groove 17 of the housing 10, thereby embedding the power plate 2 in the outer wall of the housing so that it is coplanar to the outer wall. Thus, the motor 1 does not have electric cords that are protruded outward from the housing 10, and does not have electric cords that are detached due to a pulling force.

Figure 4:
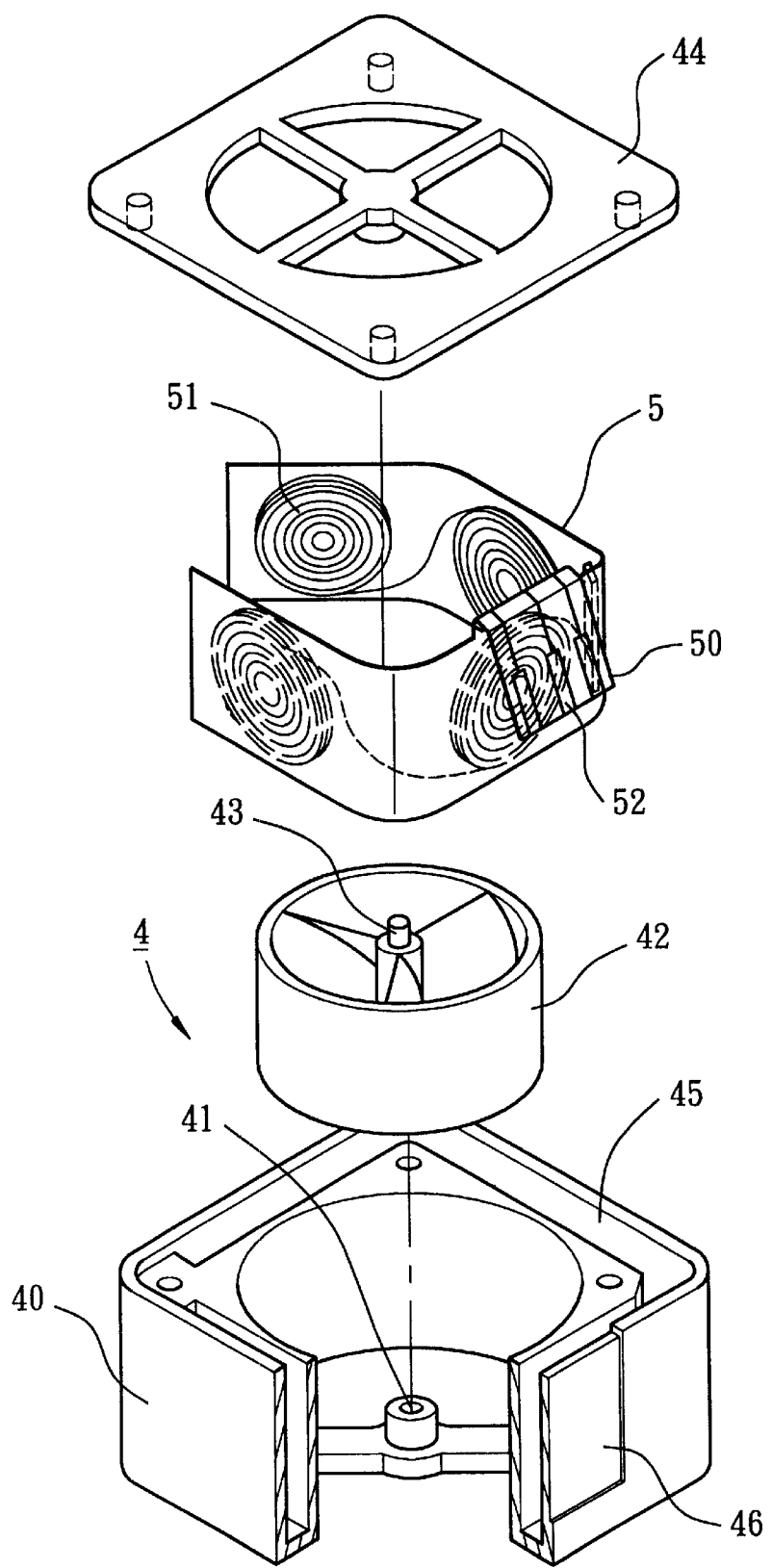
FIG. 4 is an exploded perspective view in accordance with a second embodiment of the present invention.

Referring to FIG. 4, a direct current motor 4 in accordance with a second embodiment of the present invention comprises a housing 40 provided with a shaft seat 41. A rotor 42 has a rotation shaft 43 having a first end rotatably mounted in the shaft seat 41, and a second end pivoted on a cover plate 44. The wall of the housing has an annular groove 45 for receiving a film printed circuit 5. A power plate 50 extends from the film printed circuit 5, and the film printed circuit 5 is provided with multiple coils 51 and a sensing drive member (not shown). The power plate 50 is provided with connection terminals 22 that may be connected to the electric power. The power plate 50 is protruded outward from the annular groove 45, and is bent and bonded on the outer wall of the housing 40. In the preferred embodiment, the outer wall of the housing 40 may be provided with an insertion groove 46 so that the poewr plate 50 may be inserted into and positioned in the insertion groove 46.

Figure 5:
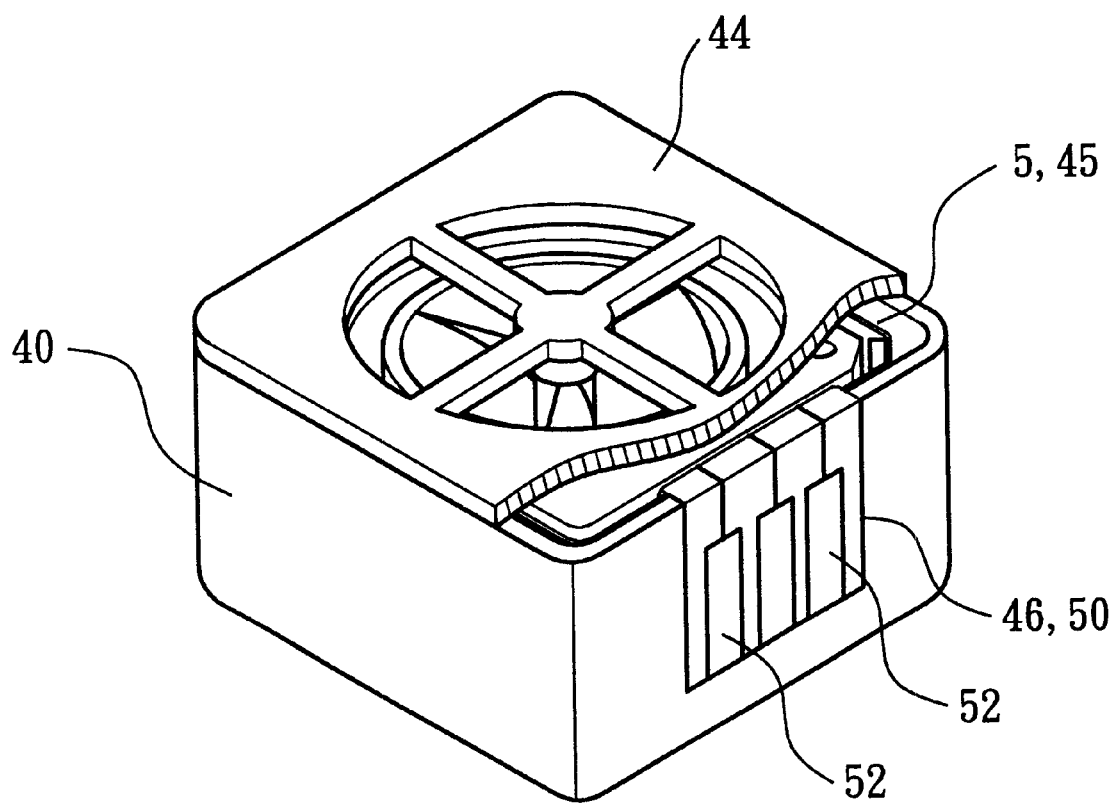
FIG. 5 is a perspective assembly view in accordance with the second embodiment of the present invention.
Figure 6:
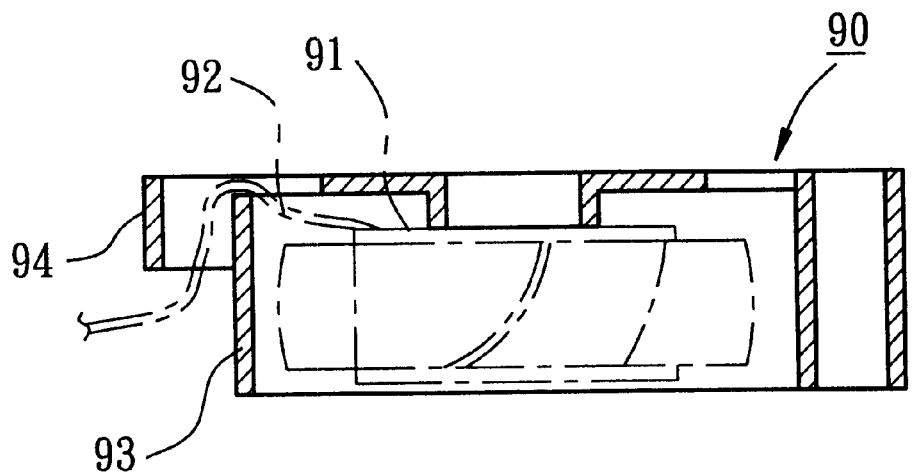
FIG. 6 is a cross-sectional assembly view of a first conventional motor in accordance with the prior art.
Figure 7:
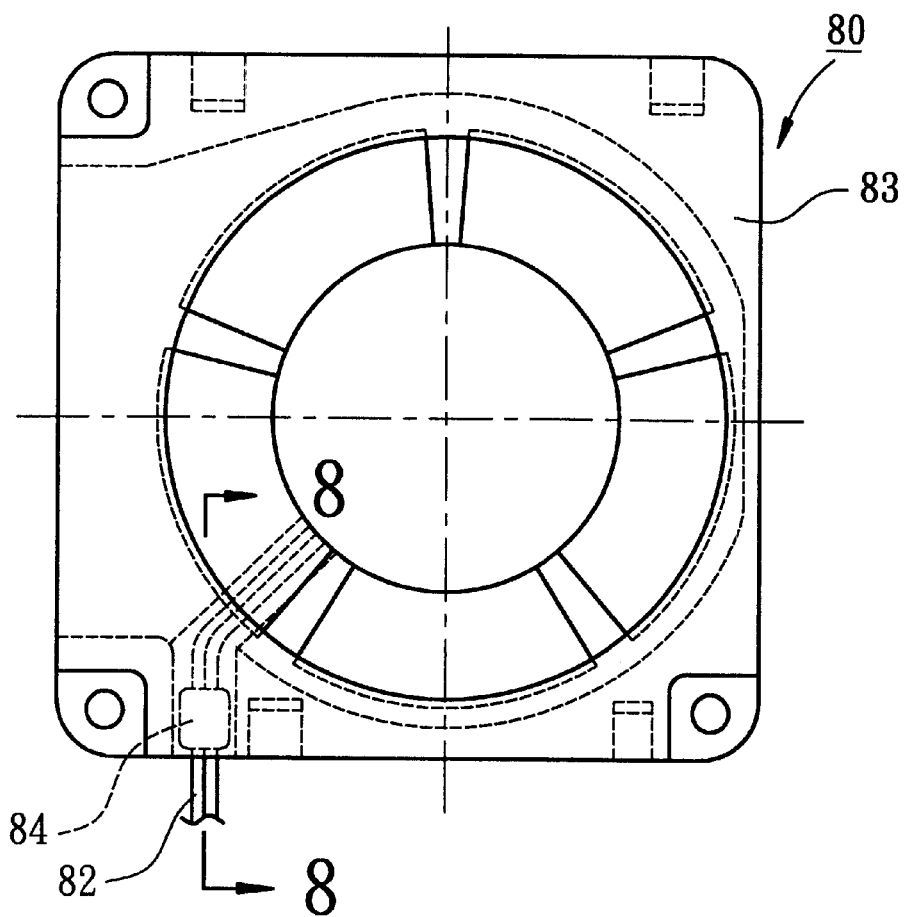
FIG. 7 is a top plan assembly view of a second conventional motor in accordance with the prior art.
Figure 8:
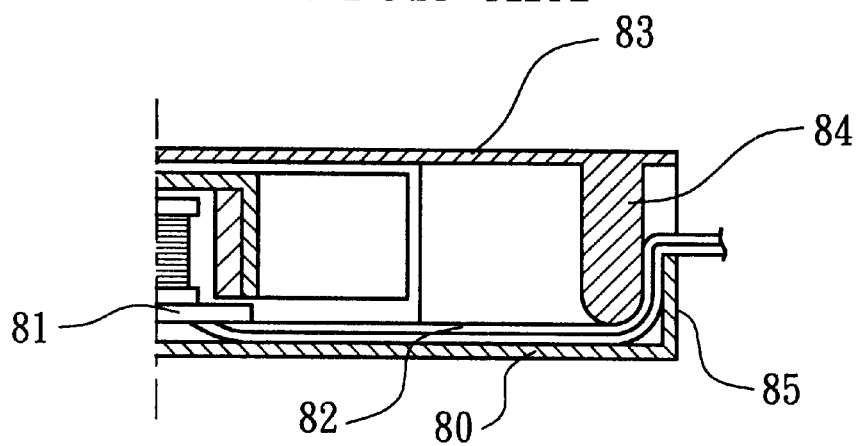
FIG. 8 is a cross-sectional view taken along line 8—8 as shown in FIG. 7.

Referring to FIG. 5, the direct current motor in accordance with the second embodiment of the present invention is assembled. The film printed circuit 5 is mounted in the annular groove 45 of the housing 40, and the power plate 50 is inserted into and positioned in the insertion groove 46 of the housing 40, and the connection terminal 22 of the power plate 50 may be connected to the electric power. Thus, the motor 4 does not have electric cords that are protruded outward from the housing 40, and does not have electric cords that are detached due to a pulling force.

Accordingly, the direct current motor or the heatsink fan using the direct current motor does not have electric cords that are protruded outward from the housing, and does not have electric cords that are detached due to a pulling force. Thus, the poor quality of fabrication of the direct current motor may be reduced, and the outer appearance of the direct current motor may be simpler and more beautiful. In addition, the direct current motor or the heatsink fan is convenient in use and storage.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electric power connection structure of a direct current motor, comprising:
    a housing having a bottom board provided with a shaft seat combined with a stator and a circuit board provided with a drive circuit, a rotor having a rotation shaft rotatably mounted in a shaft tube of the stator, the housing at least having an outer wall; and
    a power plate having a connection circuit, the connection circuit having a first end formed with a connection terminal arranged to be connected to an electric power source, and a second end electrically connected to a drive circuit of the circuit board,
    wherein a flat end of the power plate is mounted on the outer wall of the housing, and
    wherein the flat end of the power plate is embedded in and coplanar to the outer wall of the housing.

2. The electric power connection structure of a direct current motor as claimed in claim 1, wherein the circuit board is provided with a drive circuit and the power plate is formed by a film printed circuit.

3. The electric power connection structure of a direct current motor as claimed in claim 1, wherein the outer wall of the housing is provided with an insertion groove and the power plate is inserted into and positioned in the insertion groove.

4. The electric power connection structure of a direct current motor as claimed in claim 1, wherein the bottom board of the housing has an annular wall which is provided with a cutout for passage of the connection circuit.

5. An electric power connection structure of a direct current motor, comprising:
    a housing having a shaft seat, a rotor having a rotation shaft having one end rotatably mounted in the shaft seat, the housing at least having an outer wall; and
    a film printed circuit provided with multiple coils and a sensing drive member, the film printed circuit including a power plate extending from the film printed circuit, the power plate being provided with connection terminals arranged to be connected to an electric power source,
    wherein a flat end of the power plate is mounted on the outer wall of the housing, and
    wherein the flat end of the power plate is embedded in and coplanar to the outer wall of the housing.

6. The electric power connection structure of a direct current motor as claimed in claim 5, wherein the housing has an annular groove for receiving and positioning the film printed circuit.

7. The electric power connection structure of a direct current motor as claimed in claim 5, wherein the outer wall of the housing is provided with an insertion groove and the power plate of the film printed circuit is inserted into and positioned in the insertion groove.

* * * * *